Nov. 27, 1962     E. O. DIXON ETAL     3,065,931
TARGET-SEEKING GUIDANCE SYSTEM
Filed March 19, 1958     3 Sheets-Sheet 1

Edgar O. Dixon
Stephen M. MacNeille
INVENTORS

BY
ATTORNEYS

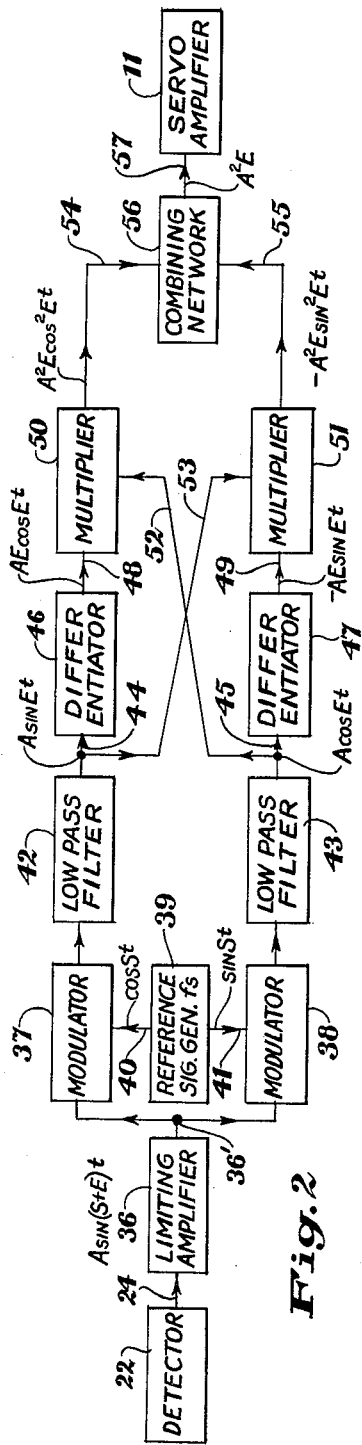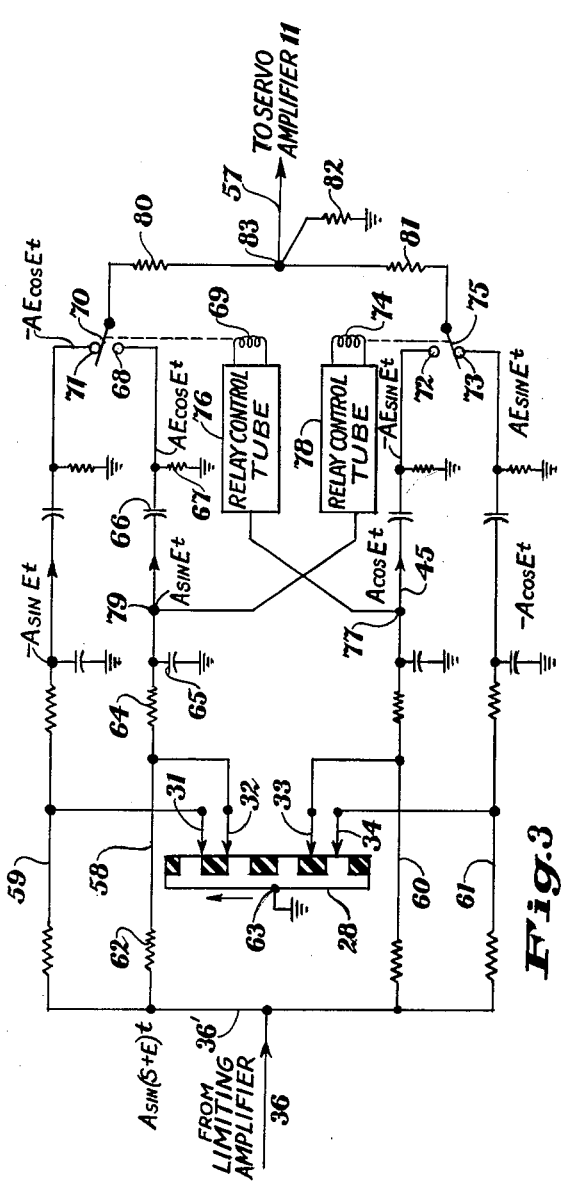

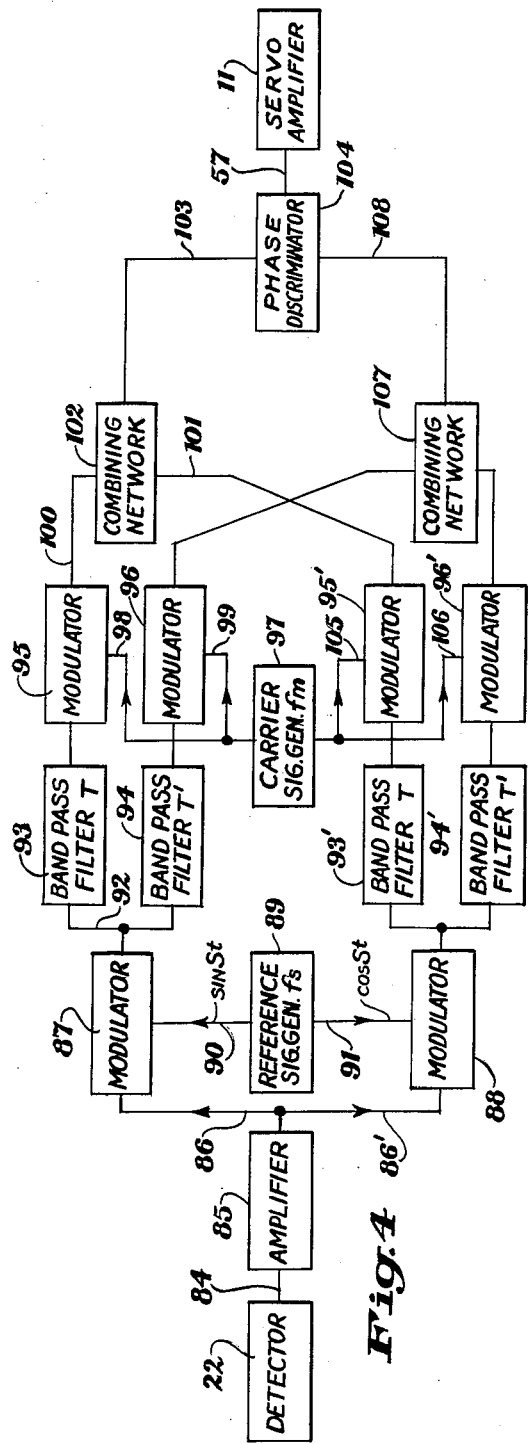
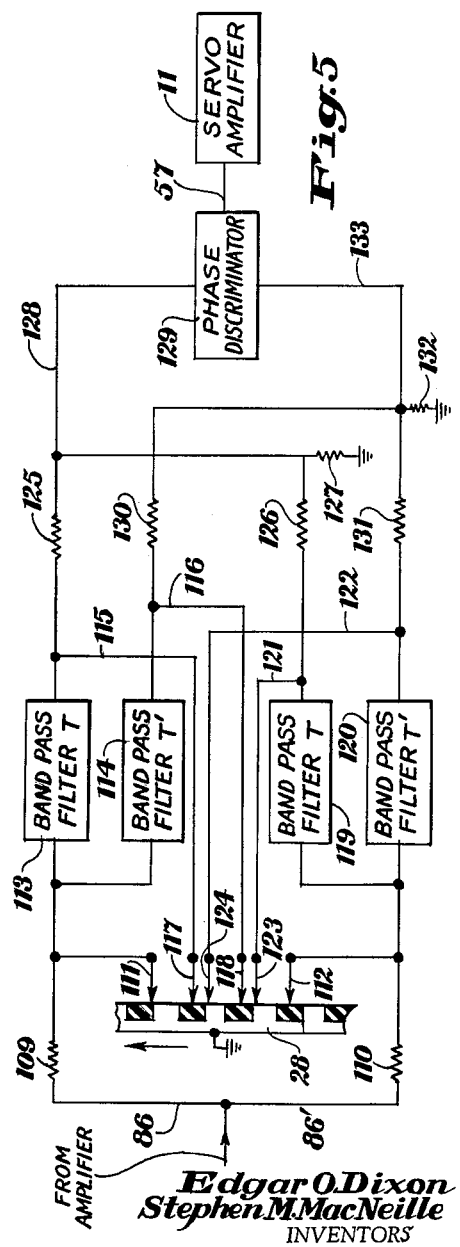

United States Patent Office 3,065,931
Patented Nov. 27, 1962

3,065,931
TARGET-SEEKING GUIDANCE SYSTEM
Edgar O. Dixon, East Woodstock, and Stephen M. Mac-
Neille, Thompson, Conn., assignors, by mesne assign-
ments, to the United States of America as represented
by the Secretary of the Navy
Filed Mar. 19, 1958, Ser. No. 722,620
3 Claims. (Cl. 244—14)

This invention relates to a target-seeking guidance system which is particularly well adapted for use in guiding a missle on a collision course to an intended target.

When a missile is on such a collision course, the line of sight to the target will remain at a constant angle relative to the line of flight of the missile so long as the speed and course of both target and missile are constant. Any change in this angular relationship indicates that the missile is off course and the instant invention is directed to a system which will detect any such angular change in either of two rectangularly related coordinate planes and produce appropriate output control voltages which may be applied to the usual missile control system to cause the latter to initiate corrective control action.

It is an object of this invention to provide such a guidance system wherein relative shifting of the line of sight in either coordinate plane will produce a corresponding variation in frequency at the output of a target sensing detector associated with that plane and wherein means are provided for rapidly detecting even extremely small changes in frequency and for producing therefrom an output control voltage indicative of both the sense and extent of the change in frequency.

A further object of the invention is to provide such a system wherein the frequency of the output signal from the detector is compared with a reference signal of predetermined frequency to derive a pair of error signals of predetermined phase relationship at a frequency equal to the difference in frequency between the detector output signal and the reference signal and to derive from said error signals an output control voltage the polarity and amplitude of which are indicative of the sense and degree of deviation of the missile from its desired collision course and which is directly useable to initiate appropriate control corrections to restore the missile to its desired path.

Further objects will become apparent from the following description and claims particularly when considered in the light of the accompanying drawings wherein:

FIG. 2 is a block diagram of one form of error discriminating system which may be utilized in our improved guidance control system.

FIG. 3 is a schematic diagram of a discriminator operating on the same principle as that shown in FIG. 2.

FIG. 4 is a block diagram of another form of error discriminating system which may be utilized.

FIG. 5 is a schematic diagram of a discriminator operating on the same principle as that shown in FIG. 4.

Figure 1:
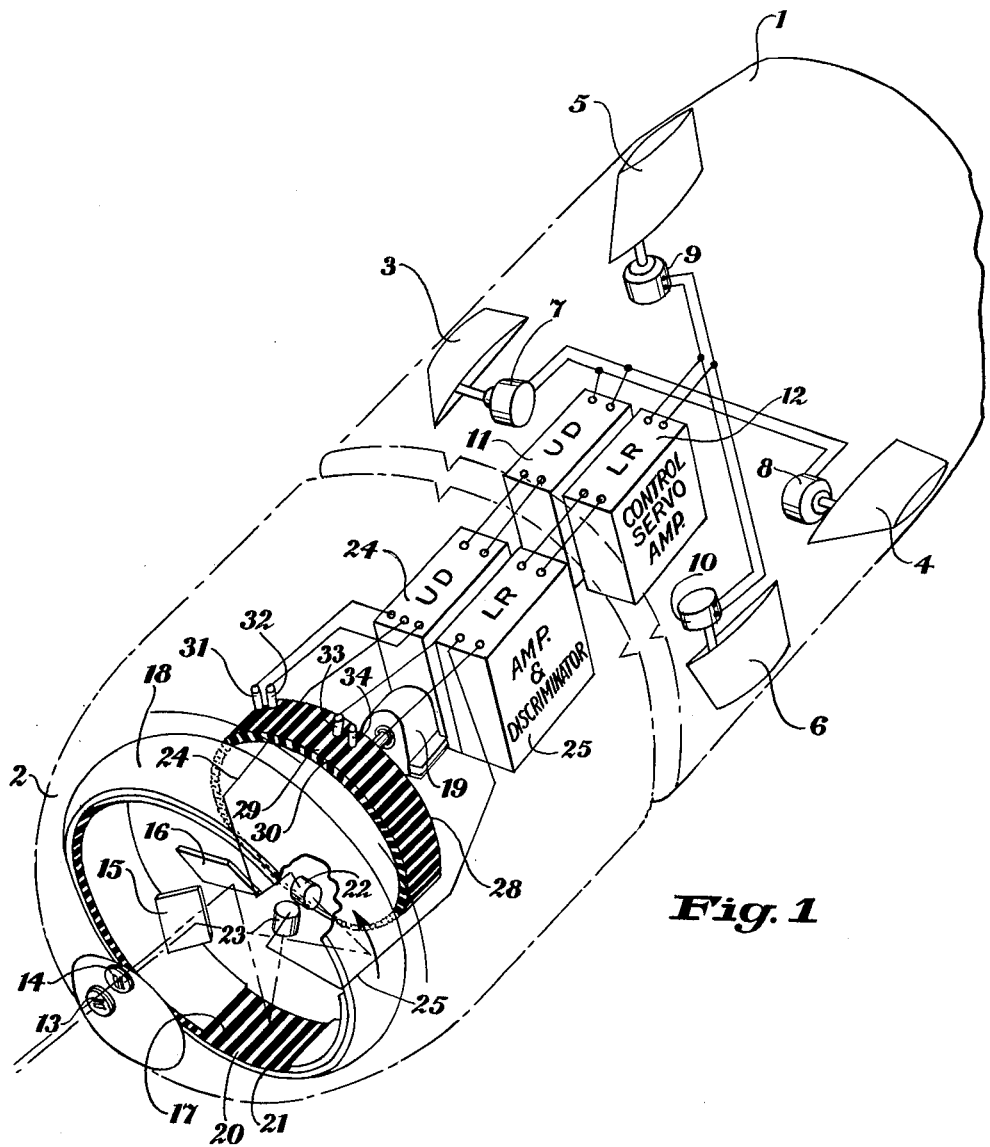
FIG. 1 is a fragmentary view, partly in phantom lines, of a missile incorporating our invention.

Our invention will be described as being applied to the control of a guided missile such as is indicated by phantom lines in FIG. 1. This missile is shown as including the conventional guidance control surfaces 3 and 4, pivoted about a horizontal axis to control up-and-down movement of the missile and corresponding pivoted control surfaces 5 and 6 for controlling the lateral direction of the missile. Servo motors 7, 8, 9 and 10 are adapted to position the guidance control surfaces in accordance with the output of the conventional control servo amplifiers 11 and 12.

In the nose portion 2 of the missile is a target sensing head which may conveniently be of the general type shown and described in the companion application of Cary, Kesel and MacNeille Serial No. 722,621 entitled "Target Seeking Head for Guided Missile" and now Patent Number 2,997,595. As is described in detail in said copending application the target sensing head comprises a pair of objective lenses 13 and 14 which direct energy emanating from a target to a pair of plane mirrors 15 and 16 and thence into focus on the inner surface 17 of a rotary scanning drum 18 adapted to be rotated at a constant speed by a suitable motor 19. The surface 17 of the scanning drum 18 is made in the form of alternately arranged reflecting and non-reflecting strips 20, 21 the arrangement being such that energy passing through the objective 13 will be cyclically reflected onto the up-down detector 22 by the strips 20 sweeping past the target image. Similarly, energy passing through the objective 14 will be cyclically reflected by the strips 20 onto the left-right detector 23. With this arrangement if the missile is on a true collision course with the target (the line of sight from the missile to the target being, under these circumstances, at a constant angle relative to the line of flight of the missile) the output signals from each of the detectors will vary at a cyclical rate which will hereafter be termed the normal scanning frequency. If the missile is not on a true collision course with the target, the line of sight from the missile to the target will be shifting in one or both coordinate planes and the output from one or both of the detectors 22, 23 will occur at a frequency somewhat above or below the normal scanning frequency, the difference in frequency being dependent upon the rate at which the sighting axis is shifting relative to the line of flight of the missile. Thus any deviation of the missile from a true collision course will be indicated by a departure of the signal frequency at the output of one or both of the detectors from the normal scanning frequency and, by measuring this frequency difference, together with the sense of the difference (decrease or increase of frequency) a signal may be developed which can be applied in known manner to the servo amplifiers to initiate appropriate corrective action.

For greatest control accuracy, it is essential that any deviation of the detector output signals from the normal scanning frequency be detected in as short a time as is possible so that immediate corrective control action may be taken. When the missile is nearly on course, since the relative shifting of the line of sight will be quite slow, the difference between the detector output frequency and the normal scanning frequency will be correspondingly small and it is therefore highly desirable that a corrective control signal be derived therefrom in substantially less than one cycle of this difference or error frequency. The discriminators shown in FIGS. 2–5 and described hereinbelow effectively satisfy the above requirement.

FIG. 2 illustrates, in block diagram form, one embodiment of such a discriminator. It is to be understood that separate discriminators as described below are to be provided for both the up-down and left-right channels. However, for ease of explanation only the discriminator used in the up-down channel will be described in detail. Thus, in FIG. 2, the output from the up-down detector 22 is applied as at 24 to a limiting amplifier 36. The output of this limiting amplifier, appearing at point 36' is then fed, in parallel to each of two modulators 37 and 38 where it is modulated by reference signals appearing at the outputs 40, 41 of a reference signal generator 39, the frequency of the reference signals from this generator being equal to the normal scanning frequency. The two outputs 40 and 41 from this signal generator 39 are 90° out of phase with one another for a purpose which will be later explained. The modulated outputs from modulators 37 and 38 are then passed respectively through low pass filters 42 and 43, the pass characteristics of these filters being such that only those signal components constituting the difference frequencies, that is, the difference between the reference frequency (normal scanning frequency) and the detector output frequency, being permitted to pass through the filters. The error frequency outputs from these filters are then passed as at 44, 45 to differentiators 46 and 47, the outputs from these differentiators being in turn applied as at 48, 49 to one input of multipliers 50 and 51 respectively. The second input for multiplier 50 in the upper branch is derived as indicated at 52 from the output of the low pass filter 43 in the lower branch. Similarly, the second input to multiplier 51 in the lower branch is derived as at 53 from the output of low pass filter 42 in the upper branch. The outputs from multipliers 50 and 51 are then fed as indicated at 54, 55 to a combining network 56, the output of which will be a D.C. voltage proportional to the error frequency and of a polarity which will indicate whether the detector output frequency is higher than or lower than the normal scanning frequency. This output may therefore be applied as indicated at 57 to the up-down servo amplifier 11 to cause the latter in known manner to initiate appropriate control corrections.

In order to facilitate an understanding of the operation of this discriminating system it will be helpful to examine the nature of the signals appearing at various points in the system. The fundamental output frequency from the detector 22 will be at a frequency equal to the algebraic sum of the normal scanning frequency and the error frequency and may be mathematically represented by the formula: $\sin(S+E)t$. The amplitude of this signal as it emerges from the limiting amplifier 36 will be represented by the letter A so that, at the point 36' the signal may be designated $A \sin(S+E)t$. The signals at the outputs 40 and 41 of the reference signal generator 39 may similarly be represented by the expressions $\cos St$ and $\sin St$ respectively since they occur at the normal scanning frequency and are 90° out of phase with respect to one another. It can be shown mathematically that the signals produced by combining the above-mentioned signals in modulators 37 and 38 will appear, at the outputs of the low pass filters 42 and 43, as a pair of sine waves at the error frequency and 90° out of phase with one another at this frequency. They may be represented by the expressions $A \sin Et$ and $A \cos Et$ respectively. Each of these signals is then differentiated by the differentiator 46 and 47 so that the signals applied respectively to the multipliers 50 and 51 at their inputs 48 and 49 may be designated $AE \cos Et$ and $-AE \sin Et$. As indicated in FIG. 2 multiplier 50 therefore multiplies together the signals $AE \cos Et$ and $A \cos Et$ to produce at its output a signal $A^2E \cos^2 Et$. Similarly, the output from multiplier 51 will be $-A^2E \sin^2 Et$. Upon algebraically subtracting these signals from one another in combining network 56 a D.C. voltage equal to $A^2E$ will appear at the output 57 of the combining network. This output signal or error voltage will be directly proportional to the error frequency and, it can be shown that its polarity will be a direct indication of whether the output from the detector is higher than or lower than the normal scanning frequency. This output or error voltage is then applied to the conventional servo amplifier 11 which should, of course, be of the well-known type adapted to respond to the polarity and amplitude of an error voltage to actuate the appropriate control surface in such a direction as to reduce this voltage to zero.

While conventional components may be utilized in the system described in conjunction with FIG. 2 an approximation to the action of this system may readily be obtained by utilizing the arrangement shown in FIG. 3. Thus, by utilizing the commutator 28 with its brushes 31–34 as synchronous rectifiers the function of the reference signal generator 39 and its associated modulators 37 and 38 may be readily obtained. Moreover, by providing four such synchronous rectifying channels to produce four signals in phase quadrature at the error signal frequency, together with a pair of relays operated with a 90° phase displacement at the error frequency, the multiplication action may be very readily obtained with a minimum of parts.

As is indicated thereon, the circuitry shown in FIG. 3 is intended to be inserted between the limiting amplifier 36 and the servo amplifier 11 of FIG. 2. As is shown in FIG. 3 the signal appearing at the output 36' of the limiting amplifier is applied in parallel to each of four channels 58, 59, 60 and 61. As is clear from the figure, each of these channels is in most respects similar to the others so that a detailed description will be given only of channel 58. Thus, it can be seen that this channel includes an isolating resistor 62 which, together with the commutator brush 32 serves to modulate the input signal by cyclically grounding the signal through the brush 32 and commutator 28, which is grounded as indicated at 63. The signal, as thus modulated, is then passed to the low pass filter formed of resistor 64 and condenser 65 so that, at the output 79 thereof, a difference or error signal $A \sin Et$ will appear. This signal is then fed through the differentiator formed by condenser 66 and resistor 67 and the resulting differentiated signal is applied to one terminal 68 of a relay 69 having a movable contact 70. The signal passing through channel 59 will similarly be modulated at the normal scanning frequency, filtered, differentiated and applied to the other terminal 71 of relay 69. As is indicated by the relative positions of brushes 31 and 32, the modulation frequency of the signal passed through channel 59 will be 180° out of phase with that passing through channel 58. Channels 60 and 61 are similar respectively to channels 58 and 59 except that the commutator brushes 33 and 34 are located on the commutator so that they are respectively 90° and 270° behind brush 32 at the normal scanning frequency. Thus, the signal appearing at point 77 will equal $A \cos Et$ and will therefore be 90° out of phase at the error frequency with that appearing at point 79 in channel 58. Relay 69 which controls the movable contact 70 associated with channels 58 and 59 is controlled by a relay control tube 76, the input of which is obtained from point 77 in channel 60. Similarly, relay 74 associated with channels 60 and 61 is controlled by a relay control tube 78 responsive to the signal appearing at point 79 of channel 58. With this arrangement the signals appearing at the terminals 71 and 68 will correspond to $\pm AE \cos Et$ while those appearing at relay terminals 72 and 73 will correspond to $\pm AE \sin Et$. The movable contact 70 of relay 69 serves to alternately select the signals appearing at terminals 71 and 68 in phase with the signal at point 77 so that the output from the movable contact 70 of the relay 69 will be substantially equal to $A^2E \cos^2 Et$. Similarly, the output from the contact 75 of relay 74 will be approximately equal to $A^2E \sin^2 Et$. These signals are then added together by means of the network formed by resistors 80, 81 and 82 so that the output at the common terminal 83 of this network will therefore be substantially equal to $A^2E$ and, as previously described, may be used directly to control the servo amplifier 11.

FIG. 4 is a block diagram of another form of discriminator system which may likewise be utilized to determine the sense and amplitude of the error frequency in appreciably less than one cycle thereof. The output from the detector 22 is applied as at 84 to an amplifier 85. However, unlike the amplifier 36 of the FIG. 2 and 3 embodiment, amplifier 85 does not include any limiting means so that the output thereof will be substantially a true replica of the input signal. This amplified signal is applied as at 86—86' to a pair of modulators 87—88. These modulators are supplied as indicated at 90, 91 with reference signals obtained from a reference signal generator 89 the output frequency of which is equal to the normal scanning frequency. As in the previously described embodiment the two signals from this reference generator are 90° out of phase with one another. There will therefore appear at the outputs of the modulators 87, 88 a pair of signals having components at the error frequency, these error frequency components being 90° out of phase with one another. Except for this phase difference, the two channels and the signals therein are similar and therefore the following discussion will be primarily directed to the channel beginning with modulator 87. The output from this modulator 87 is applied as at 92 to a pair of band pass filters 93 and 94 so designed as to pass only signals lying within the range of the expected error frequencies. These filters are designed to have slightly different center frequencies and with correspondingly different time constants, so that the error signals fed thereto will be shifted in phase relative to one another to an extent corresponding to the error frequency. These phase shifted signals are then applied to modulators 95 and 96 where they are combined with a carrier signal of much higher frequency obtained from a carrier signal generator 97, the output of which is applied, in phase, to both modulators 95 and 96 as indicated at 98 and 99. The relative phase difference introduced by the two filters 93 and 94 will be retained during the process of modulation and will therefore be present in the relatively high frequency signals appearing at the outputs of modulators 95 and 96. Meanwhile, in the channel including modulator 88, the error signal appearing at its output, and which, as previously explained, will be 90° out of phase with that at the output of modulator 87, is applied to a similar pair of band pass filters 93' and 94', corresponding respectively to filters 93 and 94 to introduce a similar phase difference between their outputs. The phase shifted signals appearing at the outputs of these filters are then similarly applied to a pair of modulators 95' and 96'. In these modulators the relatively phase shifted signals are combined with a carrier signal derived from the carrier signal generator 97 but which is 90° out of phase with the carrier signal applied to modulators 95 and 96.

The relatively high frequency signals appearing at the outputs of modulators 95 in the upper channel and 95' in the lower channel are then applied as indicated at 100 and 101 to a combining network 102 where they are added together.

Similarly the outputs of modulators 96 and 96' are combined in a combining network 107. The outputs of networks 102 and 107 are then applied as at 103, 108 to a conventional phase discriminator 104 designed for operation at the relatively high frequency present at the outputs of networks 102 and 107. Phase discriminator 104 will preferably be of the well-known type which will produce at its output a control voltage the amplitude of which is proportional to the phase difference between the two input signals and the phase or polarity of which is indicative of the sense of the relative phase difference therebetween. This output or control voltage can then be applied as at 57 to the servo amplifier 11 to initiate appropriate control corrections.

It should be noted that the two signals applied to network 102 have both been subjected to the same phase shift as they passed through the band pass filters 93 and 93'. Thus, the only difference in phase between these two signals will be that introduced at the two modulations they undergo. It can be shown mathematically that with the arrangement shown the signals appearing at 100 and 101 will each comprise a pair of signal components, one of a frequency equal to the sum of the carrier frequency and the error frequency and the other equal to the difference between these frequencies. However, due to the fact that one of these signals has been twice modulated with signals 90° out of phase with respect to those applied to the other, one of the side frequency components at 101 will be 180° out of phase with the corresponding component at 100 and this component will therefore be cancelled out in the combining network 102 so that only one side frequency component will appear at 103. The same action will obtain as regards the signals applied to network 107. Once again the one component will be cancelled out and the side frequency signal appearing at 108 will be of the same frequency as that at 103 and will differ in phase therefrom solely to an extent determined by the difference in phase shift introduced by the band pass filters 93 and 94 (or their counterparts 93' and 94'). Since the phase shift in each filter is a function of the frequency and the time constant of the filter, and the latter is fixed and known, the phase difference between the signals fed to discriminator 104 is therefore a direct measure of the sense and magnitude of the frequency difference between the output from the detector 22 and the normal scanning frequency obtained from reference signal generator 89.

Thus the operation of the system shown in FIG. 4 may be briefly summarized as follows. The output from the detector is mixed with or modulated by two 90° out-of-phase signals at the normal scanning frequency to produce two pairs of sum and difference frequencies, the latter corresponding to the error signal. The error signals are then passed through the two pairs of band pass filters (which effectively remove all other frequency components) to introduce a differential phase shift indicative of the error signal frequency. These low frequency signals are then again converted into signals at a sufficiently high frequency to enable use of a conventional phase discriminator to sense this differential phase shift. This is done by again mixing or modulating these signals with relatively high frequency signals obtained from carrier signal generator 97. The resulting signals will include two components having frequencies equal to the sum of and difference between the carrier and error frequencies. However, due to the relative phasing of the modulators one or the other of these components will be cancelled out when the outputs are combined in the networks 102 and 107. Thus there will appear at the input of the phase discriminator 104 two signals of equal frequency (approximately equal to the carrier frequency since the error frequency will normally be very low) but of a relative phase relationship directly dependent upon the sense and magnitude of the error. The resulting output from the discriminator is therefore suitable for direct application to the servo control amplifier to initiate the proper control action.

Where, as is usually true, the normal scanning frequency is sufficiently high that conventional phase discriminators may be used to measure the phase difference between two signals at that frequency, both the reference signal and the carrier signal of FIG. 4 may be readily obtained directly from the commutator 28. Such an arrangement is shown in FIG. 5. The signal from the amplifier 85 is fed as at 86, 86' to the modulators formed by isolating resistors 109 and 110 and their associated commutator brushes 111–112. As is diagrammatically indicated in this figure brushes 111 and 112 are 90° out of phase with one another at the normal scanning frequency. The outputs from these modulators are then fed to the band pass filters 113 and 114 in the upper channel and the corresponding filters 119, 120 in the lower channel. The outputs from the filters 113 and 114 will, as previously described, have a phase difference therebetween which is a direct measure of the error frequency. These outputs are then modulated at the normal scanning frequency (which now serves as the carrier signal frequency of FIG. 4) as by means of commutator brushes 117 and 118 which are in phase synchronism with one another. Similarly, the outputs from the filters 119 and 120 are modulated at the normal scanning frequency by virtue of their connections to commutator brushes 123 and 124. However, it should be noted that these latter brushes are 90° out of phase with the brushes 117 and 118. The modulated outputs from filters 119 and 113 are then combined by the combining network formed by resistors 125, 126 and 127, the output from this network being applied as at 128 to one input of the conventional phase discriminator 129. Similarly, the modulated signals from filters 114 and 120 are combined by the resistance network 130, 131, 132 and applied as at 133 to the other input of phase discriminator 129. As described above with respect to FIGURE 4, the signals appearing at 128 and 133 will be of the same frequency (approximately the normal scanning frequency) but will differ in phase to an extent and in a sense determined by the degree and direction of the guidance error. The output from discriminator 129 is therefore directly useable for corrective control action. While the modulation of the various signals by the brushes is equivalent to multiplication by square waves rather than by sine waves, the signals resulting from such modulation will include the same basic frequency components as where true sine wave modulating signals were employed, and the additional harmonic frequencies which are generated will not adversely affect the operation.

From the above it is believed apparent that we have provided an error frequency determining system which is extremely well adapted for use in conjunction with the guidance of missiles and which will sense and positively determine both the degree and direction of error in the missile course. Each of the various embodiments illustrated utilizes relatively few components which may be of conventional type and therefore readily obtainable. By utilizing a commutator and its associated brushes the modulation of the various signals to obtain the desired result may be readily performed since signals of any desired phase may be obtained merely by locating the particular brush involved at the proper position on the periphery of the commutator. The form of the invention shown in FIGS. 4 and 5 is particularly advantageous in distinguishing and accurately determining the error frequency in the presence of a background signal.

It will be obvious to those skilled in the art that many variations and modifications can be made in the disclosed arrangements without departing from the spirit and scope of the invention as defined by the appended claims.

In the specific embodiment disclosed, to avoid unnecessary confusion, the line of flight of the missile has been assumed to be coincident with the longitudinal axis of the missile and the seeker head has therefore been shown as rigidly mounted on the missile. As is well known in the art, in an actual missile the seeker head would normally be carried on a gyro stabilized assembly within the missile so that pitch or yaw motions of the missile would not produce false guidance information. The principles of the invention are obviously equally applicable to such an arrangement and the term missile axis as used herein is intended to mean the actual line of flight of the missile whether it be coincident with the longitudinal axis of the missile itself or to a gyro-stabilized reference axis within the missile.

We claim:

1. A guidance control system for guiding a missile toward a target, said missile comprising control surfaces for controlling the direction of movement of said missile in each of two coordinate planes, said system comprising two target scanning means carried by said missile, one scanning means producing a scanner output signal having alternate current components the instantaneous frequencies of which relative to a predetermined normal scanning frequency are indicative of the sense and magnitude of the instantaneous deviation of the line of flight of said missile from a collision course with said target in one of said coordinate planes and the other scanning means producing a scanner output signal having alternate current components the instantaneous frequencies of which relative to said normal scanning frequency are indicative of the sense and magnitude of the instantaneous deviation of the line of flight of said missile from a collision course with said target in the other of said coordinate planes, means for amplifying the scanner output signals of both of said scanning means, first and second frequency discriminating means the first of which is responsive to the output of the amplifying means for said one scanning means to produce a first output control voltage of a polarity and amplitude proportional to the sense and degree of the difference between the frequency of the output of said one scanning means and said normal scanning frequency and the second of which is responsive to the output of the amplifying means of said other scanning means to produce a second output control voltage of a polarity and amplitude proportional to the sense and degree of the difference between the frequency of the output of said other scanning means and said normal scanning frequency, and first and second servo means responsive to the polarity and amplitude of the output control voltages from said first and second discriminating means respectively for repositioning said control surfaces to redirect said missile onto a course such that the frequency of the scanner output signals of said one scanning means and said other scanning means tend to equal said normal scanning frequency, said first and second frequency discriminating means each including a pair of channels to which the amplified scanner output signal from the associated scanning means is applied in parallel, means in each channel for modulating at said normal scanning frequency the amplified scanner output signal applied thereto, the relative phasing of such modulation being 90 degrees out of phase between the channels of each pair of channels whereby two error signals are produced by each pair of channels 90 degrees out of phase with one another and of a frequency equal to the difference in frequency between said normal scanning frequency and the frequency of the associated scanner output signal, and means for deriving one of said output control voltages from the error signals produced by the associated pair of channels.

2. A guidance control system as set forth in claim 1 wherein each of said amplifying means includes means for limiting the amplitude of said amplified scanner output signals and wherein said deriving means associated with said first discriminating means and said deriving means associated with said second discriminating means each includes means for differentiating the error signal in each channel, means for effectively multiplying the error signal in each channel by the output of the differentiating means associated with the other channel of the associated pair of channels, and means for algebraically combining the outputs from said multiplying means to produce one of said output control voltages.

3. A guidance control system as set forth in claim 1 wherein said deriving means associated with said first discriminating means and said deriving means associated with said second discriminating means each includes first and second pairs of band pass filters adapted to pass said error signals therethrough, one filter of said first pair and one filter of said second pair being connected to the output of the modulating means of one channel and the second filter of said first pair and the second filter of said second pair being connected to the output of the modulating means of the other channel, the filters of said first pair having different pass characteristics from the filters of said second pair whereby an error signal passing through a filter of said first pair will undergo a different phase shift than a similar error signal passing through a filter of said second pair, the degree of such differential phase shift being dependent upon the frequency of said error signal, individual modulating means for modulating the signals at the output of both filters in both channels at a relatively high carrier frequency and with a 90 degree relative phase difference at such carrier frequency between the modulations of the pair of signals in one channel and those in the other channel, a first network for algebraically combining the outputs of that pair of said last-mentioned modulating means, one in each channel, associated with said first pair of filters, a second network for algebraically combining the outputs of that pair of said last-mentioned modulating means, one in each channel, associated with said second pair of filters, and a phase discriminator connected to the outputs of said networks and effective in the general range of said carrier frequency for producing a voltage signal in accordance with the relative phase of the signals at the outputs of said networks.

References Cited in the file of this patent

UNITED STATES PATENTS

| | | |
|---|---|---|
| 2,575,047 | Crosby | Nov. 13, 1951 |
| 2,688,442 | Droz | Sept. 7, 1954 |
| 2,837,718 | Catherall | June 3, 1958 |